United States Patent
He et al.

(10) Patent No.: US 11,450,081 B2
(45) Date of Patent: Sep. 20, 2022

(54) EXAMINATION PAPER CORRECTION METHOD AND APPARATUS, ELECTRONIC DEVICE, AND STORAGE MEDIUM

(71) Applicant: Hangzhou Dana Technology Inc., Zhejiang (CN)

(72) Inventors: Tao He, Zhejiang (CN); Lihui Mao, Zhejiang (CN); Huan Luo, Zhejiang (CN); Mingquan Chen, Zhejiang (CN)

(73) Assignee: Hangzhou Dana Technology Inc., Zhejiang (CN)

( * ) Notice: Subject to any disclaimer, the term of this patent is extended or adjusted under 35 U.S.C. 154(b) by 0 days.

(21) Appl. No.: 17/425,331

(22) PCT Filed: Jan. 21, 2020

(86) PCT No.: PCT/CN2020/073397
§ 371 (c)(1),
(2) Date: Jul. 23, 2021

(87) PCT Pub. No.: WO2020/156362
PCT Pub. Date: Aug. 6, 2020

(65) Prior Publication Data
US 2022/0101030 A1 Mar. 31, 2022

(30) Foreign Application Priority Data
Feb. 2, 2019 (CN) .......................... 201910107570.3

(51) Int. Cl.
*G06V 10/22* (2022.01)
*G06T 7/70* (2017.01)
(Continued)

(52) U.S. Cl.
CPC .............. *G06V 10/225* (2022.01); *G06T 7/70* (2017.01); *G06V 10/40* (2022.01);
(Continued)

(58) Field of Classification Search
CPC ...... G06V 10/225; G06V 10/40; G06V 30/10; G06T 7/70; G06T 2207/20084; G06T 2207/30176
See application file for complete search history.

(56) References Cited

U.S. PATENT DOCUMENTS 8,878,874 B2 * 11/2014 Yano ...................... G03G 15/36
358/1.18
9,734,132 B1 * 8/2017 Kothandapani Shanmugasundaram ....................
G06F 40/103
(Continued)

FOREIGN PATENT DOCUMENTS

CN 102855495 1/2013
CN 105046200 11/2015
(Continued)

OTHER PUBLICATIONS

"Office Action of China Counterpart Application", dated Jul. 13, 2020, with English translation thereof, pp. 1-15.
(Continued)

*Primary Examiner* — Ian L Lemieux
(74) *Attorney, Agent, or Firm* — JCIP Global Inc.

(57) ABSTRACT

An examination paper correction method and apparatus, an electronic device, and a storage medium are provided. The method includes: obtaining a first image of a standard examination paper; identifying an area and characters of each standard answer in the first image, and using a marking box to mark an answering area where each standard answer is located; determining position information of each marking box; obtaining a second image of an examination paper to be corrected; determining, according to the position information of each marking box of the first image, an answering area in the second image matching a position of the marking box, and using a marking box to mark the determined
(Continued)

answering area; identifying characters of an answer to be corrected in each marking box of the second image; and comparing the characters of the standard answer with the characters of the answer to be corrected.

8 Claims, 2 Drawing Sheets

(51) Int. Cl.
    *G06V 10/40*     (2022.01)
    *G06V 30/10*     (2022.01)

(52) U.S. Cl.
    CPC ............... *G06T 2207/20084* (2013.01); *G06T 2207/30176* (2013.01); *G06V 30/10* (2022.01)

(56) References Cited

U.S. PATENT DOCUMENTS

| | | | | |
|---|---|---|---|---|
| 10,706,530 | B2* | 7/2020 | Hu | G06K 9/6254 |
| 2003/0020963 | A1* | 1/2003 | Currans | H04N 1/33315 |
| | | | | 358/406 |
| 2006/0018544 | A1* | 1/2006 | Ohguro | G06V 30/1463 |
| | | | | 382/181 |
| 2007/0031802 | A1* | 2/2007 | Koyama | G09B 7/06 |
| | | | | 434/323 |
| 2014/0064618 | A1* | 3/2014 | Janssen, Jr. | G06F 40/211 |
| | | | | 382/182 |
| 2015/0187219 | A1* | 7/2015 | Sheppard | G09B 3/06 |
| | | | | 434/354 |
| 2015/0379341 | A1* | 12/2015 | Agrawal | G06V 30/414 |
| | | | | 382/176 |
| 2017/0004374 | A1* | 1/2017 | Osindero | G06F 16/5846 |
| 2017/0262738 | A1* | 9/2017 | Hu | G06V 30/15 |
| 2018/0032842 | A1* | 2/2018 | Yellapragada | G06T 7/11 |
| 2020/0159820 | A1* | 5/2020 | Rodriguez | G06F 40/137 |
| 2020/0175267 | A1* | 6/2020 | Schäfer | G06V 30/18057 |

FOREIGN PATENT DOCUMENTS

| | | |
|---|---|---|
| CN | 104376315 | 1/2018 |
| CN | 107590494 | 1/2018 |
| CN | 108764074 | 11/2018 |
| CN | 108932508 | 12/2018 |
| CN | 109815932 | 5/2019 |

OTHER PUBLICATIONS

"Office Action of China Counterpart Application", dated Jan. 15, 2021, with English translation thereof, pp. 1-18.

"International Search Report (Form PCT/ISA/210) of PCT/CN2020/073397," dated Mar. 26, 2020, with English translation thereof, pp. 1-4.

"Written Opinion of the International Searching Authority (Form PCT/ISA/237) of PCT/CN2020/073397," dated Mar. 26, 2020, pp. 1-5.

* cited by examiner

EXAMINATION PAPER CORRECTION METHOD AND APPARATUS, ELECTRONIC DEVICE, AND STORAGE MEDIUM

CROSS-REFERENCE TO RELATED APPLICATION

This application is a 371 of international application of PCT application serial no. PCT/CN2020/073397, filed on Jan. 21, 2020, which claims the priority benefit of China application no. 201910107570.3, filed on Feb. 2, 2019. The entirety of each of the above mentioned patent applications is hereby incorporated by reference herein and made a part of this specification.

BACKGROUND

Technical Field

The disclosure relates to the technical field of teaching and information processing, and in particular to an examination paper correction method and apparatus, an electronic device, and a computer-readable storage medium.

Description of Related Art

At present, most teachers assign homework to students and test learning results of students in the form of examination papers, which have led to the need for teachers to correct a large number of examination papers of students. However, in the prior art, the way teachers correct examination papers is relatively traditional and is usually based on handwriting. Such manner is generally inefficient and is prone to errors. For example, if a teacher corrects examination papers of 60 students every day and spends 5 minutes to correct each student, the teacher needs to work 5 hours every day.

Therefore, how to improve the efficiency of correcting examination papers by teachers is an urgent problem to be solved.

SUMMARY

The objective of the disclosure is to provide an examination paper correction method and apparatus, an electronic device, and a computer-readable storage medium, so as to solve the problem of relatively low efficiency of correcting examination papers by teachers in the prior art.

In order to achieve the above objective, the disclosure provides an examination paper correction method, which includes the following.

A first image of a standard examination paper is obtained. An answering area in the standard examination paper is filled with a standard answer.

The answering area of each standard answer and characters of each standard answer in the first image are identified through a pre-trained identification model, and a first marking box is used to mark the answering area of each standard answer.

Position information of the first marking box corresponding to each answering area is determined.

A second image of an examination paper to be corrected is obtained. An answering area in the examination paper to be corrected is filled with an answer to be corrected.

According to the position information of the first marking box corresponding to each answering area of the first image, an answering area in the second image matching a position of the first marking box corresponding to the answering area is determined, and a second marking box is used to mark the determined answering area.

Through the pre-trained identification model, characters of the answer to be corrected in each second marking box of the second image are identified.

The characters of the standard answer in the first marking box corresponding to each answering area in the first image are compared with the characters of the answer to be corrected in the second marking box corresponding to the corresponding answering area in the second image to complete correction of the examination paper to be corrected.

Optionally, determining the position information of the first marking box corresponding to each answering area includes the following.

A first two-dimensional coordinate system is established for the first image, and position information of the first marking box corresponding to each answering area in the first two-dimensional coordinate system is determined.

According to the position information of the first marking box corresponding to each answering area of the first image, determining the answering area in the second image matching the position of the first marking box corresponding to the answering area includes the following.

A second two-dimensional coordinate system is established for the second image, and according to the first marking box corresponding to each answering area of the first image, the answering area in the second image and whose position information in the second two-dimensional coordinate system matches the position information of the first marking box corresponding to the answering area in the first two-dimensional coordinate system is determined.

A corresponding relationship between the second two-dimensional coordinate system and the examination paper to be corrected is the same as a corresponding relationship between the first two-dimensional coordinate system and the standard examination paper.

Optionally, the position information of the first marking box in the first two-dimensional coordinate system includes: center coordinates of the first marking box and a height and a length of the first marking box.

Optionally, determining the position information of the first marking box corresponding to each answering area includes the following.

An area where each question of the standard examination paper is located in the first image is identified, and a third marking box is used for marking.

A relative position of the first marking box corresponding to each answering area in the third marking box corresponding to the corresponding question is determined.

According to the position information of the first marking box corresponding to each answering area of the first image, determining the answering area in the second image matching the position of the first marking box corresponding to the answering area includes the following.

An area where each question of the examination paper to be corrected is located in the second image is identified, and a fourth marking box is used for marking.

According to the first marking box corresponding to each answering area of the first image, the answering area in the second image matching the position of the first marking box corresponding to the answering area is determined, and the second marking box is used to mark the determined answering area. A relative position of the marked second marking box in the fourth marking box corresponding to the corresponding question of the examination paper to be corrected matches a relative position of the first marking box corresponding to the answering area in the third marking box corresponding to the corresponding question of the standard examination paper.

Optionally, using the first marking box to mark the answering area where each standard answer is located includes the following.

A pre-trained marking model is adopted to use the first marking box to mark the answering area where each standard answer is located.

In order to achieve the above objective, the disclosure also provides an examination paper correction apparatus, which includes the following.

A first obtaining module is configured to obtain a first image of a standard examination paper. An answering area in the standard examination paper is filled with a standard answer.

A first marking module is configured to identify the answering area of each standard answer and characters of each standard answer in the first image through a pre-trained identification model, and use a first marking box to mark the answering area of each standard answer.

A determining module is configured to determine position information of the first marking box corresponding to each answering area.

A second obtaining module is configured to obtain a second image of an examination paper to be corrected. An answering area in the examination paper to be corrected is filled with an answer to be corrected.

A second marking module is configured to determine an answering area in the second image matching a position of the first marking box corresponding to the answering area according to the position information of the first marking box corresponding to each answering area of the first image, and use a second marking box to mark the determined answering area.

An identification module is configured to identify characters of the answer to be corrected in each second marking box of the second image through the pre-trained identification model.

A correction module is configured to compare the characters of the standard answer in the first marking box corresponding to each answering area in the first image with the characters of the answer to be corrected in the second marking box corresponding to the corresponding answering area in the second image to complete correction of the examination paper to be corrected.

Optionally, the determining module determining the position information of the first marking box corresponding to each answering area includes the following.

A first two-dimensional coordinate system is established for the first image, and position information of the first marking box corresponding to each answering area in the first two-dimensional coordinate system is determined.

The second marking module determining the answering area in the second image matching the position of the first marking box corresponding to the answering area according to the position information of the first marking box corresponding to each answering area of the first image includes the following.

A second two-dimensional coordinate system is established for the second image, and according to the first marking box corresponding to each answering area of the first image, the answering area in the second image and whose position information in the second two-dimensional coordinate system matches the position information of the first marking box corresponding to the answering area in the first two-dimensional coordinate system is determined.

A corresponding relationship between the second two-dimensional coordinate system and the examination paper to be corrected is the same as a corresponding relationship between the first two-dimensional coordinate system and the standard examination paper.

Optionally, the position information of the first marking box in the first two-dimensional coordinate system includes: center coordinates of the first marking box and a height and a length of the first marking box.

Optionally, the determining module determining the position information of the first marking box corresponding to each answering area includes the following.

An area where each question of the standard examination paper is located in the first image is identified, and a third marking box is used for marking.

A relative position of the first marking box corresponding to each answering area in the third marking box corresponding to the corresponding question is determined.

The second marking module determining the answering area in the second image matching the position of the first marking box corresponding to the answering area according to the position information of the first marking box corresponding to each answering area of the first image includes the following.

An area where each question of the examination paper to be corrected is located in the second image is identified, and a fourth marking box is used for marking.

According to the first marking box corresponding to each answering area of the first image, the answering area in the second image matching the position of the first marking box corresponding to the answering area is determined, and the second marking box is used to mark the determined answering area. A relative position of the marked second marking box in the fourth marking box corresponding to the corresponding question of the examination paper to be corrected matches a relative position of the first marking box corresponding to the answering area in the third marking box corresponding to the corresponding question of the standard examination paper.

Optionally, the first marking module using the first marking box to mark the answering area of each standard answer includes the following.

A pre-trained marking model is adopted to use the first marking box to mark the answering area where each standard answer is located.

In order to achieve the above objective, the disclosure also provides an electronic device, which includes a processor, a communication interface, a memory, and a communication bus. The processor, the communication interface, and the memory communicate with one another through the communication bus.

The memory is configured to store a computer program.

When the processor is configured to execute the computer program stored in the memory, the examination paper correction method according to any one of the above is implemented.

In order to achieve the above objective, the disclosure also provides a computer-readable storage medium. The computer-readable storage medium is stored with a computer program. When the computer program is executed, the examination paper correction method according to any one of the above is implemented.

Compared with the prior art, in the disclosure, for the standard examination paper, character content of the standard answer in the standard examination paper is identified and the position information of the standard answer is determined; and for the examination paper to be corrected, the position information of the matching answer to be corrected is determined according to the position information of the determined standard answer, and character content of the answer to be corrected is identified, thereby comparing the identified standard answer with the matching answer to be corrected to complete correction of the examination paper to be corrected without manually correcting the examination paper, which solves the problem of relatively low efficiency of correcting examination papers by teachers in the prior art. In addition, for the standard examination paper and the examination paper to be corrected, only the character contents of the answers need to be identified, and contents of remaining parts in the examination papers are omitted, which further improves the correction speed.

DETAILED DESCRIPTION OF DISCLOSED EMBODIMENTS

An examination paper correction method and apparatus, an electronic device, and a computer-readable storage medium proposed by the disclosure will be described in further detail below with reference to the drawings and specific embodiments. According to the claims and the following description, the advantages and features of the disclosure will be clearer. It should be noted that the drawings all adopt very simplified forms and all use imprecise proportions, which are only used to conveniently and clearly assist in explaining the objective of the embodiments of the disclosure.

In order to solve the problem of the prior art, embodiments of the disclosure provide an examination paper correction method and apparatus, an electronic device, and a computer-readable storage medium.

It should be noted that the examination paper correction method of the embodiment of the disclosure may be applied to the examination paper correction apparatus of the embodiment of the disclosure, and the examination paper correction apparatus may be configured on the electronic device. The electronic device may be a personal computer, a mobile terminal, etc. The mobile terminal may be a hardware device with various operating systems such as a mobile phone or a tablet computer.

Figure 1:
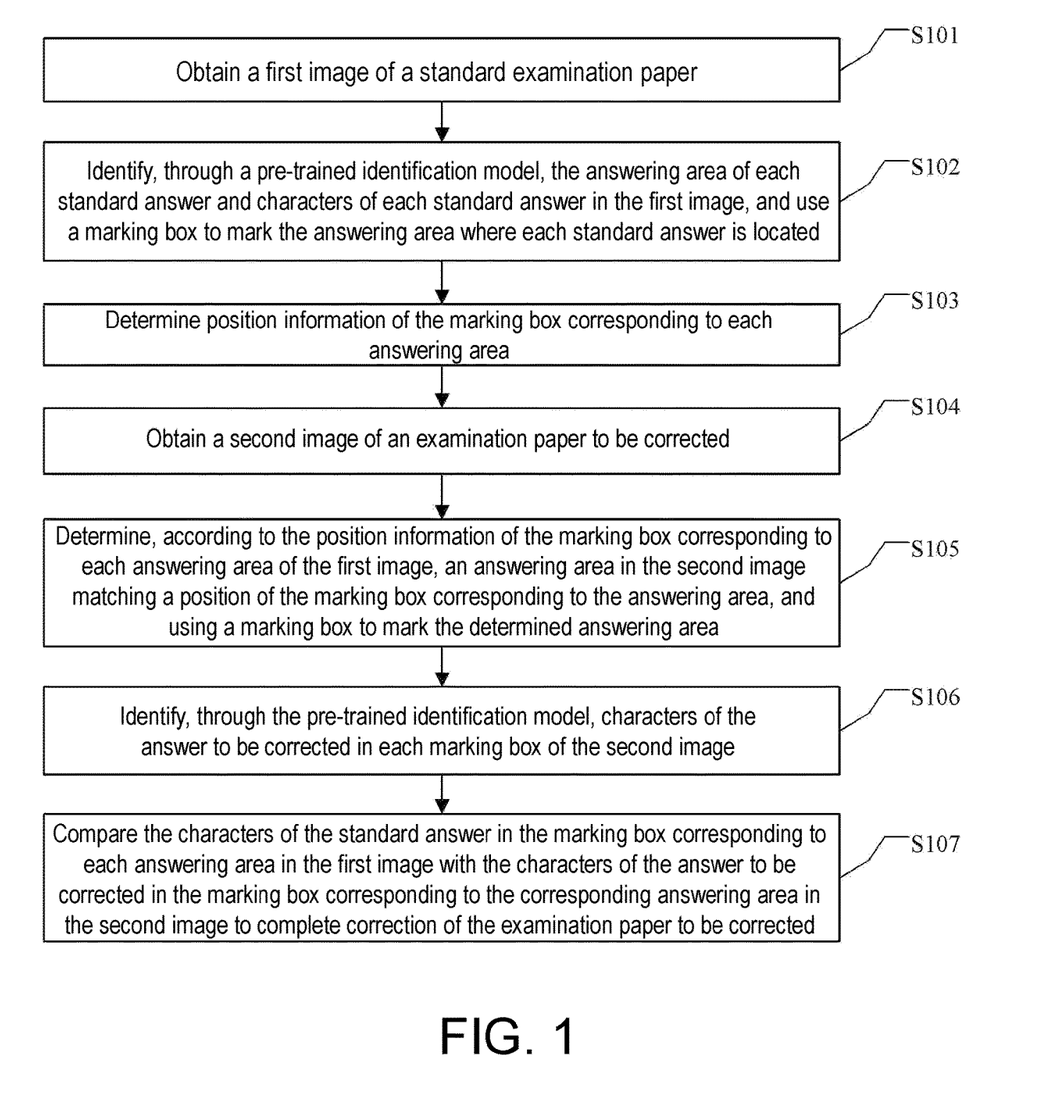
FIG. 1 is a schematic flowchart of an examination paper correction method according to an embodiment of the disclosure.

FIG. 1 is a schematic flowchart of an examination paper correction method according to an embodiment of the disclosure. Please refer to FIG. 1. The examination paper correction method may include the following steps.

First, Step S101 to Step S103 are executed to process a standard examination paper (such as an answered examination paper with answers handwritten by the teacher).

In Step S101, a first image of the standard examination paper is obtained.

An answering area in the standard examination paper is filled with a standard answer.

In Step S102, an area of each standard answer and characters of each standard answer in the first image are identified through a pre-trained identification model, and a marking box is used to mark the answering area where each standard answer is located.

In Step S103, position information of the marking box corresponding to each answering area is determined.

It is understandable that after identifying the characters of each standard answer in the first image, the characters of each standard answer may be stored, and after determining the position information of the marking box corresponding to each answering area, the position information of each marking box is stored, so that when the number of examination papers to be corrected is larger, the examination papers to be corrected may be corrected one by one according to the stored characters of the standard answer and the position information of the marking box, thereby further improving the correction speed when the number of examination papers to be corrected is larger.

Then, Step S104 to Step S106 are executed to process an examination paper to be corrected (such as an answered examination paper with answers handwritten by the student).

In Step S104, a second image of an examination paper to be corrected is obtained.

An answering area in the examination paper to be corrected is filled with an answer to be corrected.

In Step S105, according to the position information of the marking box corresponding to each answering area of the first image, an answering area in the second image matching a position of the marking box corresponding to the answering area is determined, and a marking box is used to mark the determined answering area.

In Step S106, through the pre-trained identification model, characters of the answer to be corrected in each marking box of the second image are identified.

The first image and the second image may be obtained through scanning or may be obtained through other manners such as photographing, which is not limited by the disclosure.

Finally, after respectively performing the above processing on the standard examination paper and the examination paper to be corrected, character content of each answer in the standard examination paper and the examination paper to be corrected and a corresponding relationship between the answers in the two examination papers may be obtained. Therefore, Step S107 may be executed to correspond the answers in the standard examination paper and the examination paper to be corrected one-to-one, so as complete correction of the examination paper to be corrected.

In Step S107, the characters of the standard answer in the marking box corresponding to each answering area in the first image are compared with the characters of the answer to be corrected in the marking box corresponding to the corresponding answering area in the second image to complete correction of the examination paper to be corrected.

It should be noted that there may be an answering area not filled with an answer (that is, there is no character of an answer to be corrected the answering area) in the examination paper to be corrected. Such answering area is also be marked in Step S105. However, an identification result of the characters of the answer to be corrected for such answering area in Step S106 is blank, so in Step S107, since the characters of the answer to be corrected do not match the characters of the standard answer, a correction result for such answering area is a mistake.

In practical applications, in Steps S102 and S106, the pre-trained identification model may be established based on a Dilated/Atrous convolution and an attention model. Specifically, answers in an examination paper training sample are marked. The Dilated/Atrous convolution is adopted to perform feature extraction on the marking boxes where the answers are located. Then, the extracted features are decoded into characters through the attention model, thereby training to obtain the identification model. The pre-trained identification model may identify the characters of each standard answer in the first image and may also identify the characters of the answer to be corrected in each marking box of the second image.

In Step S102, the position where each standard answer is located may be identified (for example, the area where a handwritten font may be identified on the standard examination paper is the position where the standard answer is located) through the identification model. Then, the characters of each standard answer may be identified, and the answering area may be marked.

In Step S102, the marking box is used to mark the answering area where each standard answer is located. Specifically, a pre-trained marking model may be adopted to use the marking box to mark the answering area where each standard answer is located. Similarly, in Step S105, the marking box is used to mark the determined answering area. Specifically, the pre-trained marking model may be adopted to use the marking box to mark the determined answering area.

The marking model may be a model based on a neural network. Specifically, the marking model may be obtained through the following process: performing marking processing with the marking box on the answering area where the answer in the examination paper training sample is located, and training the neural network using the examination paper training sample after the marking processing to obtain the marking model.

When marking the examination paper training sample, for a multiple-choice question, the answering area is an area within a bracket in the question, so the marking box is used to mark the area within the bracket; and for a fill-in-the-blank question, the answering area is an area above a horizontal line in the question, so the marking box is used to mark the area above the horizontal line. Similarly, the marking box corresponding to the answering area of an oral arithmetic question is a blank area after an equal sign, and the marking box corresponding to the answering area of a calculation question is a blank area below a question stem until the top of the next question.

Determining the position information of the marking box corresponding to each answering area in Step S103 will be described in detail below. The position information of the marking box corresponding to each answering area may be the position of the marking box corresponding to each answering area in the entire examination paper or may be the position of the marking box corresponding to each answering area in the corresponding question (the corresponding question is the question corresponding to the answering area).

For the first case, in Step S103, the manner of determining the position information of the marking box corresponding to each answering area may be: establishing a first two-dimensional coordinate system for the first image, and determining that the position information of the marking box corresponding to each answering area in the first two-dimensional coordinate system.

The position information of the marking box in the first two-dimensional coordinate system may include: the center coordinates of the marking box, and the height and the length of the marking box.

It is understandable that the first two-dimensional coordinate system may take the position of any pixel in the first image as the origin and any two mutually perpendicular directions as the horizontal axis and the vertical axis. For example, the origin of the first two-dimensional coordinate system may be the position where a first pixel (that is, the pixel corresponding to the first row and the first column in the first image) is located in the first image, and the horizontal axis and the vertical axis are respectively the upper edge and the left edge of the first image (the top edges and the left edge of the first image are mutually perpendicular). Alternatively, the origin of the first two-dimensional coordinate system may be a pixel corresponding to the upper left vertex of the standard examination paper in the first image, and the horizontal axis and the vertical axis are respectively the upper edge and the left edge of the standard examination paper in the first image (the upper edge and the left edge of the standard examination paper are mutually perpendicular). After establishing the first two-dimensional coordinate system, the center coordinates of the marking box corresponding to each answering area, and the height and the length of the marking box may be determined.

Correspondingly, in Step S105, the manner of determining the answering area in the second image matching the position of the marking box corresponding to the answering area according to the position information of the marking box corresponding to each answering area of the first image may be as follows.

A second two-dimensional coordinate system is established for the second image. For the marking box corresponding to each answering area of the first image, the answering area in the second image and whose position information in the second two-dimensional coordinate system matches the position information of the marking box corresponding to the answering area in the first two-dimensional coordinate system is determined.

It should be emphasized that the corresponding relationship between the second two-dimensional coordinate system and the examination paper to be corrected is the same as the corresponding relationship between the first two-dimensional coordinate system and the standard examination paper.

For example, if the origin of the first two-dimensional coordinate system is the pixel corresponding to the upper left vertex of the standard examination paper in the first image, and the horizontal axis and the vertical axis are respectively the upper edge and the left edge of the standard examination paper in the first image, then the origin of the second two-dimensional coordinate system is the pixel corresponding to the upper left vertex of the examination paper to be corrected in the second image, and the horizontal axis and the vertical axis are respectively the upper edge and the left edge of the examination paper to be corrected in the second image.

For another example, if the origin of the first two-dimensional coordinate system is the position where the first pixel is located in the first image, and the horizontal axis and the vertical axis are respectively the upper edge and the left edge of the first image, then the origin of the second two-dimensional coordinate system is the first pixel in the second image, and the horizontal axis and the vertical axis are respectively the upper edge and the left edge of the second image. It should be noted that such case requires the first image and the second image to have the same basis for establishing the two-dimensional coordinate systems. In practical applications, a specific scanning device may be used to scan the standard examination paper and the examination paper to be corrected to obtain the first image and the second image. The specific scanning device can fix examination papers to be scanned to the same specific position before scanning to ensure that the corresponding relationship between the two two-dimensional coordinate systems and examination papers in the obtained first image and second image is the same.

Since the corresponding relationship between the second two-dimensional coordinate system and the examination paper to be corrected is the same as the corresponding relationship between the first two-dimensional coordinate system and the standard examination paper, for the marking box corresponding to each answering area of the first image, according to the position information of the marking box in the first two-dimensional coordinate system, the area matching the position information may be found in the second two-dimensional coordinate system, that is, the answering area of the same question may be found in the second image.

For example, center coordinates of a marking box corresponding to an answering area 1 in the first image are (10, 10), and the height and the length are respectively 4 and 4 in the first two-dimensional coordinate system. Then, an area in the second image and whose center coordinates are (10, 10), and height and length are respectively 4 and 4 in the second two-dimensional coordinate system is searched, which is the answering area of the determined same question in the second image. It should be noted that in order to improve the fault tolerance of position information matching, when searching for the answering area matching the position information in the second image, the center coordinates are not strictly required to be exactly equal, and the center coordinates may be allowed within a specific margin of error.

For the second case, the method of determining the position information of the marking box corresponding to each answering area in Step S103 may be: identifying the area where each question of the standard examination paper is located in the first image, and using the marking box for marking; and determining the relative position of the marking box corresponding to each answering area in the marking box corresponding to the corresponding question.

Through a pre-trained question identification model, the area where each question of the standard examination paper is located in the first image is identified, and the marking box is used for marking. The question identification model may be a model based on a neural network. The trained question identification model is used to extract a two-dimensional feature vector from the first image. Anchor points with different shapes is generated in each grid of the two-dimensional feature vector. The marking box is used to mark the area of each identified question. Regression processing may also be performed on the marking box and the generated anchor points, so that the marking box is closer to the actual position of the question. After identifying a question area, each question may be cut into a single area, or may not be actually cut, and each question area is distinguished during processing to be processed as a single area and sorted according to the position information of the question.

Correspondingly, in Step S105, the manner of determining the answering area in the second image matching the position of the marking box corresponding to the answering area according to the position information of the marking box corresponding to each answering area of the first image may be as follows.

The area where each question of the examination paper to be corrected is located in the second image is identified, and the marking box is used for marking.

For the marking box corresponding to each answering area of the first image, the answering area in the second image matching the position of the marking box corresponding to the answering area is determined, and the marking box is used to mark the determined answering area. The relative position of the marked marking box in the marking box corresponding to the corresponding question of the examination paper to be corrected matches the relative position of the marking box corresponding to the answering area in the marking box corresponding to the corresponding question of the standard examination paper.

Similarly, the pre-trained question identification model may be used to identify the area where each question of the examination paper to be corrected is located in the second image, and after using the marking box to mark the identified question area, each question may be cut into a single area, or may not be actually cut, and each question area is distinguished during processing to be processed as a single area and sorted according to the position information of the question.

It is understandable that the relative position of the marking box corresponding to each answering area in the marking box corresponding to the corresponding question may be determined by using the marking box to mark each answering area of the standard examination paper in the first image and the area where each question is located. In addition, the marking box is also used to mark the area where each question of the examination paper to be corrected is located in the second image. Then, for the marking box corresponding to each answering area in the first image, according to the relative position of the marking box in the marking box corresponding to the corresponding question, the area matching the relative position may be found in the marking box corresponding to the corresponding question in the second image, that is, the answering area of the same question may be found in the second image.

It should be noted that in order to improve the fault tolerance of position information matching, when searching for the answering area matching the relative position in the marking box corresponding to each question of the examination paper to be corrected, the relative positions are not strictly required to be exactly equal, and the relative positions may be allowed within a specific margin of error.

In addition, in Step S105, according to the position information of the marking box corresponding to each answering area of the first image, the answering area in the second image matching the position of the marking box corresponding to the answering area is determined, and after using the marking box to mark the determined answering area, the corresponding relationship between the matching answering areas in the two images may also be established. In this way, in Step S107, answers in the two images may be corresponded one-to-one according to the corresponding relationship to be directly corrected.

Compared with the prior art, in the disclosure, for the standard examination paper, character content of the standard answer in the standard examination paper is identified and the position information of the standard answer is determined; and for the examination paper to be corrected, the position information of the matching answer to be corrected is determined according to the position information of the determined standard answer, and character content of the answer to be corrected is identified, thereby comparing the identified standard answer with the matching answer to be corrected to complete correction of the examination paper to be corrected without manually correcting the examination paper, which solves the problem of relatively low efficiency of correcting examination papers by teachers in the prior art. In addition, for the standard examination paper and the examination paper to be corrected, only the character contents of the answers need to be identified, and contents of remaining parts in the examination papers are omitted, which further improves the correction speed.

Figure 2:
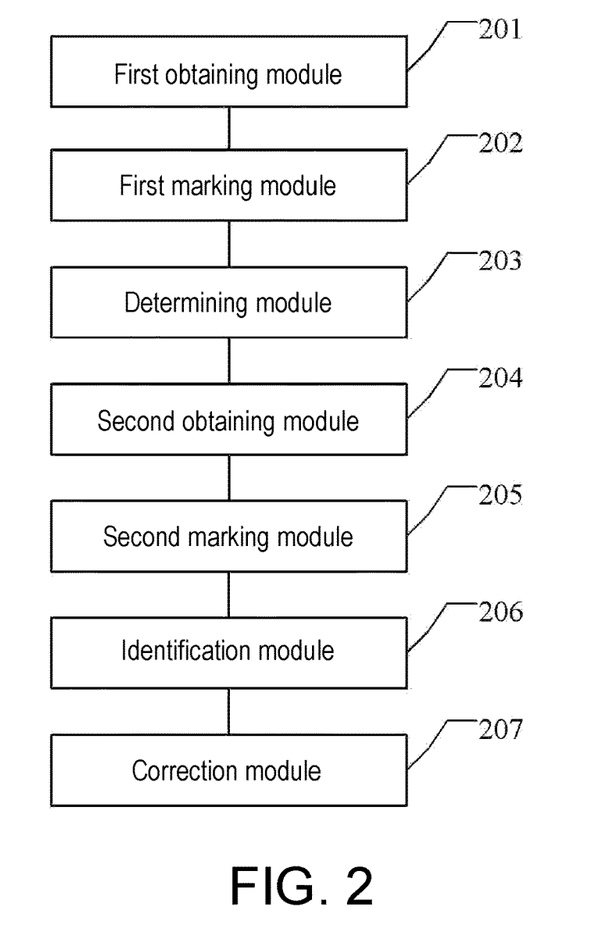
FIG. 2 is a schematic structural diagram of an examination paper correction apparatus according to an embodiment of the disclosure.

Corresponding to the embodiment of the examination paper correction method, the disclosure provides an examination paper correction apparatus. Referring to FIG. 2, the apparatus may include the following.

A first obtaining module 201 is configured to obtain a first image of a standard examination paper. An answering area in the standard examination paper is filled with a standard answer.

A first marking module 202 is configured to identify an area of each standard answer and characters of each standard answer in the first image through a pre-trained identification model, and use a marking box to mark the answering area where each standard answer is located.

A determining module 203 is configured to determine position information of the marking box corresponding to each answering area.

A second obtaining module 204 is configured to obtain a second image of an examination paper to be corrected. An answering area in the examination paper to be corrected is filled with an answer to be corrected.

A second marking module 205 is configured to determine an answering area in the second image matching a position of the marking box corresponding to the answering area according to the position information of the marking box corresponding to each answering area of the first image, and use a marking box to mark the determined answering area.

An identification module 206 is configured to identify characters of the answer to be corrected in each marking box of the second image through the pre-trained identification model.

A correction module 207 is configured to compare the characters of the standard answer in the marking box corresponding to each answering area in the first image with the characters of the answer to be corrected in the marking box corresponding to the corresponding answering area in the second image to complete correction of the examination paper to be corrected.

Optionally, the determining module 203 determining the position information of the marking box corresponding to each answering area specifically includes the following.

A first two-dimensional coordinate system is established for the first image, and the position information of the marking box corresponding to each answering area in the first two-dimensional coordinate system is determined.

The second marking module 205 determining the answering area in the second image matching the position of the marking box corresponding to the answering area according to the position information of the marking box corresponding to each answering area of the first image specifically includes the following.

A second two-dimensional coordinate system is established for the second image, and according to the marking box corresponding to each answering area of the first image, the answering area in the second image and whose position information in the second two-dimensional coordinate system matches the position information of the marking box corresponding to the answering area in the first two-dimensional coordinate system is determined.

A corresponding relationship between the second two-dimensional coordinate system and the examination paper to be corrected is the same as a corresponding relationship between the first two-dimensional coordinate system and the standard examination paper.

Optionally, the position information of the marking box in the first two-dimensional coordinate system includes: center coordinates of the marking box and a height and a length of the marking box.

Optionally, the determining module 203 determining the position information of the marking box corresponding to each answering area specifically includes the following.

An area where each question of the standard examination paper is located in the first image is identified, and a marking box is used for marking.

A relative position of the marking box corresponding to each answering area in the marking box corresponding to the corresponding question is determined.

The second marking module 205 determining the answering area in the second image matching the position of the marking box corresponding to the answering area according to the position information of the marking box corresponding to each answering area of the first image specifically includes the following.

An area where each question of the examination paper to be corrected is located in the second image is identified, and a marking box is used for marking.

According to the marking box corresponding to each answering area of the first image, the answering area in the second image matching the position of the marking box corresponding to the answering area is determined, and the marking box is used to mark the determined answering area. A relative position of the marked marking box in the marking box corresponding to the corresponding question of the examination paper to be corrected matches a relative position of the marking box corresponding to the answering area in the marking box corresponding to the corresponding question of the standard examination paper.

Optionally, the first marking module 202 using the marking box to mark the answering area where each standard answer is located specifically includes the following.

A pre-trained marking model is adopted to use the marking box to mark the answering area where each standard answer is located.

Figure 3:
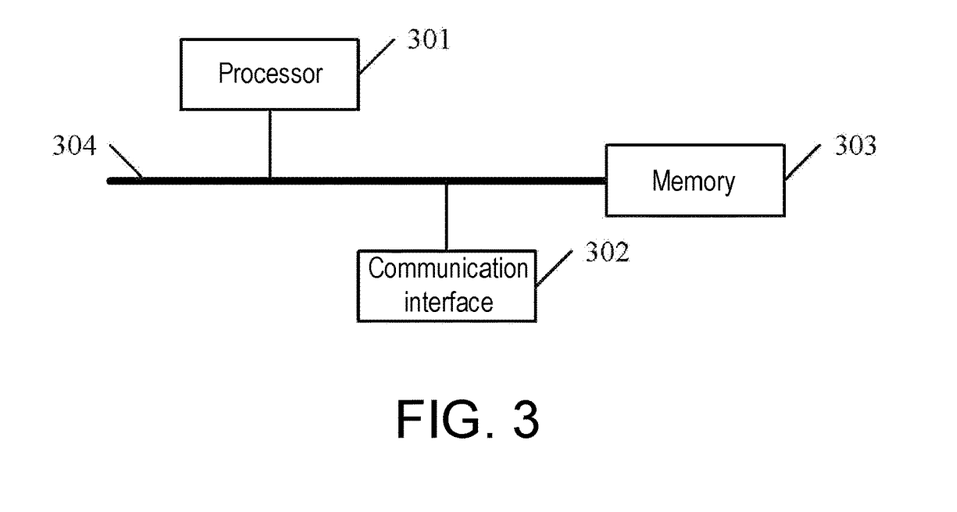
FIG. 3 is a schematic structural diagram of an electronic device according to an embodiment of the disclosure.

The disclosure also provides an electronic device, as shown in FIG. 3, the electronic device includes a processor 301, a communication interface 302, a memory 303, and a communication bus 304. The processor 301, the communication interface 302, and the memory 303 communicate with one another through the communication bus 304.

The memory 303 is used to store a computer program.

The processor 301 is used to implement the following steps when executing the computer program stored in the memory 303.

A first image of a standard examination paper is obtained. An answering area in the standard examination paper is filled with a standard answer.

An area of each standard answer and characters of each standard answer in the first image are identified through a pre-trained identification model, and a marking box is used to mark the answering area where each standard answer is located.

The marking box is used to mark the answering area where each standard answer is located in the first image, and position information of the marking box corresponding to each answering area is determined.

A second image of an examination paper to be corrected is obtained. An answering area in the examination paper to be corrected is filled with an answer to be corrected.

According to the position information of the marking box corresponding to each answering area of the first image, an answering area in the second image matching a position of the marking box corresponding to the answering area is determined, and a marking box is used to mark the determined answering area.

Through the pre-trained identification model, characters of the answer to be corrected in each marking box of the second image are identified.

The characters of the standard answer in the marking box corresponding to each answering area in the first image are compared with the characters of the answer to be corrected in the marking box corresponding to the corresponding answering area in the second image to complete correction of the examination paper to be corrected.

For the specific implementation and relevant explanation content of each step of the method, reference may be made to the embodiment of the method shown in FIG. 1 above, which will not be repeated here.

In addition, other implementations of the examination paper correction method implemented by the processor 301 executing the computer program stored in the memory 303 are the same as the implementations mentioned in the embodiment of the method, which will also not be repeated here.

The communication bus of the electronic device mentioned above may be a peripheral component interconnect (PCI) bus, an extended industry standard architecture (EISA) bus, etc. The communication bus may be divided into an address bus, a data bus, a control bus, etc. For ease of representation, the communication bus is represented by only one thick line in the drawing, but it does not mean that there is only one bus or one type of bus.

The communication interface is used for communication between the electronic device and other devices.

The memory may include a random access memory (RAM) and may also include a non-volatile memory (NVM), such as at least one disk memory. Optionally, the memory may also be at least one storage apparatus located away from the processor.

The processor may be a general processor, which includes a central processing unit (CPU), a network processor (NP), etc.; and may also be a digital signal processor (DSP), an application specific integrated circuit (ASIC), a field-programmable gate array (FPGA), or other programmable logic devices, discrete gate or transistor logic devices, or discrete hardware components.

The disclosure also provides a computer-readable storage medium. The computer-readable storage medium is stored with a computer program. The steps of the examination paper correction method according to the above is implemented when the computer program is executed by a processor.

It should be noted that each embodiment in the specification is described by adopting a relevant manner. The same or similar parts between the embodiments may be cross-referenced. Each embodiment focuses on the differences from other embodiments. In particular, since the embodiments of the apparatus, the electronic device, and the computer-readable storage medium are basically similar to the embodiment of the method, the description is relatively simple and reference may be made to partial description of the embodiment of the method for relevant parts.

In the disclosure, relational terms such as first and second are only used to distinguish one entity or operation from another entity or operation and do not necessarily require or imply any such actual relationship or order between the entities or operations. Moreover, the terms "include", "contain", or any other variants thereof are intended to cover non-exclusive inclusion, so that a process, a method, an article, or a device including a series of elements not only includes the elements, but also includes other elements not explicitly listed or includes elements inherent to the process, the method, the article, or the device. If there are no more restrictions, an element defined by the sentence "including a . . . " does not exclude the existence of other same elements in the process, the method, the article, or the device including the element.

The foregoing description is only a description of the preferred embodiments of the disclosure and does not limit the scope of the disclosure in any way. Any change or modification made by persons skilled in the art of the disclosure according to the disclosed content shall fall within the protection scope of the claims.

The invention claimed is:

1. An examination paper correction method, comprising:
   obtaining a first image of a standard examination paper, wherein a plurality of answering areas in the standard examination paper is filled with standard answers;
   identifying, through a pre-trained identification model, the answering areas of each of the standard answers and characters of each of the standard answers in the first image, and using a first marking box to mark the answering areas of each of the standard answers;
   determining position information of the first marking box corresponding to each of the answering areas;
   obtaining a second image of an examination paper to be corrected, wherein a plurality of answering areas in the examination paper to be corrected is filled with an answer to be corrected;
   determining, according to the position information of the first marking box corresponding to each of the answering areas of the first image, a plurality of answering areas in the second image matching a position of the first marking box corresponding to the answering areas, and using a second marking box to mark the determined answering areas, and when determining the answering area in the second image matching the position of the first marking box corresponding to the answering areas, adopting a relative position of two answering areas to be in a preset margin of error;
   identifying, through the pre-trained identification model, characters of the answer to be corrected in each second marking box of the second image; and
   comparing the characters of the standard answers in the first marking box corresponding to each of the answering areas in the first image with the characters of the answer to be corrected in the second marking box corresponding to the corresponding answering areas in the second image to complete correction of the examination paper to be corrected,
   wherein determining the position information of the first marking box corresponding to each of the answering areas comprises:
   establishing a first two-dimensional coordinate system for the first image, and determining position information of the first marking box corresponding to each of the answering areas in the first two-dimensional coordinate system; and
   determining, according to the position information of the first marking box corresponding to each of the answering areas of the first image, the answering areas in the second image matching the position of the first marking box corresponding to the answering areas comprising:

establishing a second two-dimensional coordinate system for the second image, and determining, according to the first marking box corresponding to each of the answering areas of the first image, the answering areas in the second image and whose position information in the second two-dimensional coordinate system matches the position information of the first marking box corresponding to the answering areas in the first two-dimensional coordinate system, wherein a corresponding relationship between the second two-dimensional coordinate system and the examination paper to be corrected is the same as a corresponding relationship between the first two-dimensional coordinate system and the standard examination paper.

2. The examination paper correction method according to claim 1, wherein the position information of the first marking box in the first two-dimensional coordinate system comprises center coordinates of the first marking box and a height and a length of the first marking box.

3. The examination paper correction method according to claim 1, wherein determining the position information of the first marking box corresponding to each of the answering areas comprises:

identifying an area where each question of the standard examination paper is located in the first image, and using a third marking box for marking; and determining a relative position of the first marking box corresponding to each of the answering areas in the third marking box corresponding to the corresponding question; and determining, according to the position information of the first marking box corresponding to each of the answering areas of the first image, the answering areas in the second image matching the position of the first marking box corresponding to the answering areas comprising:

identifying an area where each question of the examination paper to be corrected is located in the second image, and using a fourth marking box for marking; and determining, according to the first marking box corresponding to each of the answering areas of the first image, the answering areas in the second image matching the position of the first marking box corresponding to the answering areas, and using the second marking box to mark the determined answering areas, wherein a relative position of the marked second marking box in the fourth marking box corresponding to the corresponding question of the examination paper to be corrected matches a relative position of the first marking box corresponding to the answering areas in the third marking box corresponding to the corresponding question of the standard examination paper.

4. The examination paper correction method according to claim 1, wherein using the first marking box to mark the answering areas of each of the standard answers comprises:

adopting a pre-trained marking model to use the first marking box to mark the answering areas where each of the standard answers is located.

5. An examination paper correction apparatus, comprising:

a first obtaining module, configured to obtain a first image of a standard examination paper, wherein a plurality of answering areas in the standard examination paper is filled with standard answers;

a first marking module, configured to identify, through a pre-trained identification model, the answering areas of each of the standard answers and characters of each of the standard answers in the first image, and use a first marking box to mark the answering areas of each of the standard answers;

a determining module, configured to determine position information of e first marking box corresponding to each of the answering areas;

a second obtaining module, configured to obtain a second image of an examination paper to be corrected, wherein a plurality of answering areas in the examination paper to be corrected is filled with an answer to be corrected;

a second marking module, configured to determine, according to the position information of the first marking box corresponding to each of the answering areas of the first image, a plurality of answering areas the second image matching a position of the first marking box corresponding to the answering areas, and use a second marking box to mark the determined answering areas, and when determining the answering areas in the second image matching the position of the first marking box corresponding to the answering areas, adopting a relative position of two answering areas to be within a preset margin of error;

an identification module, configured to identify, through the pre-trained identification model, characters of the answer to be corrected in each second marking box of the second image; and a correction module, configured to compare the characters of the standard answers in the first marking box corresponding to each of the answering areas in the first image with the characters of the answer to be corrected in the second marking box corresponding to the corresponding answering areas in the second image to complete correction of the examination paper to be corrected, wherein the determining module determining the position information of the first marking box corresponding to each of the answering areas comprises:

establishing a first two-dimensional coordinate system for the first image, and determining position information of the first marking box corresponding to each of the answering areas in the first two-dimensional coordinate system; and the second marking box determining, according to the position information of the first marking box corresponding to each of the answering areas of the first image, the answering areas in the second image matching the position of the first marking box corresponding to the answering areas in the second image comprising:

establishing a second two-dimensional coordinate system for the second image, and determining, according to the first marking box corresponding to each of the answering areas of the first image, the answering areas in the second image and whose position information in the second two-dimensional coordinate system matches the position information of the first marking box corresponding to the answering areas in the first two-dimensional coordinate system, wherein a corresponding relationship between the second two-dimensional coordinate system and the examination paper to be corrected is the same as a corresponding relationship between the first two-dimensional coordinate system and the standard examination paper, wherein the examination paper correction apparatus comprises a processor and a memory comprising instructions executed by the processor, wherein the first obtaining module, the first marking module, the determining module, the second obtaining module, the second marking module, the identification module and the correction module are executed by the processor of the examination paper correction apparatus.

6. The examination paper correction apparatus according to claim 5, wherein the determining module determining the position information of the first marking box corresponding to each of the answering areas comprises:
   identifying an area where each question of the standard examination paper is located in the first image, and using a third marking box for marking; and
   determining a relative position of the first marking box corresponding to each of the answering areas in the third marking box corresponding to the corresponding question; and
   the second marking box determining, according to the position information of the first marking box corresponding to each of the answering areas of the first image, the answering areas in the second image matching the position of the first marking box corresponding to the answering areas comprising:
   identifying an area where each question of the examination paper to be corrected is located in the second image, and using a fourth marking box for marking; and
   determining, according to the first marking box corresponding to each of the answering areas of the first image, the answering areas in the second image matching the position of the first marking box corresponding to the answering areas, and using the second marking box to mark the determined answering areas, wherein a relative position of the marked second marking box in the fourth marking box corresponding to the corresponding question of the examination paper to be corrected matches a relative position of the first marking box corresponding to the answering areas in the third marking box corresponding to the corresponding question of the standard examination paper.

7. An electronic device, comprising a processor, a communication interface, a memory, and a communication bus, wherein the processor, the communication interface, and the memory communicate with one another through the communication bus;
   the memory is configured to store a computer program; and
   the processor is configured to execute the computer program stored in the memory, the method according to claim 1 is implemented.

8. A non-transitory computer-readable medium, wherein the non-transitory computer-readable medium stores a computer program, and when the computer program is executed, the method according to claim 1 is implemented.

* * * * *